United States Patent
Sure et al.

(10) Patent No.: US 11,061,931 B2
(45) Date of Patent: Jul. 13, 2021

(54) SCALABLE AND BALANCED DISTRIBUTION OF ASYNCHRONOUS OPERATIONS IN DATA REPLICATION SYSTEMS

(71) Applicant: International Business Machines Corporation, Armonk, NY (US)

(72) Inventors: Ravindra Sure, Bangalore (IN); Saipriya M R, Kerala (IN); Saket Kumar, Bettiah (IN); Ravi K Komanduri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 16/151,054

(22) Filed: Oct. 3, 2018

(65) Prior Publication Data

US 2020/0110831 A1  Apr. 9, 2020

(51) Int. Cl.
*G06F 16/27* (2019.01)
*G06F 9/54* (2006.01)
*G06F 16/13* (2019.01)
*G06F 16/182* (2019.01)

(52) U.S. Cl.
CPC ............ *G06F 16/278* (2019.01); *G06F 9/546* (2013.01); *G06F 16/13* (2019.01); *G06F 16/182* (2019.01)

(58) Field of Classification Search
CPC ...... G06F 16/278; G06F 16/13; G06F 16/182; G06F 9/546; G06F 9/5066; G06F 11/14; G06F 16/184; G06F 16/1858

USPC ........................................................ 707/609
See application file for complete search history.

(56) References Cited

U.S. PATENT DOCUMENTS

| | | | |
|---|---|---|---|
| 9,600,553 B1* | 3/2017 | Nigade ................ | G06F 16/278 |
| 9,639,428 B1 | 5/2017 | Boda et al. | |
| 2006/0200533 A1* | 9/2006 | Holenstein ............ | G06F 16/273 709/208 |
| 2009/0313311 A1* | 12/2009 | Hoffmann ........... | G06F 11/2097 |
| 2011/0131288 A1 | 6/2011 | Patel | |
| 2011/0161294 A1* | 6/2011 | Vengerov .............. | G06F 16/275 707/637 |
| 2014/0279884 A1 | 9/2014 | Dantkale et al. | |
| 2019/0243547 A1* | 8/2019 | Duggal ................ | G06F 3/0619 |
| 2019/0243688 A1* | 8/2019 | Karmarkar ........... | G06F 9/5011 |
| 2019/0243702 A1* | 8/2019 | Shilane ................... | G06F 9/485 |
| 2020/0125410 A1* | 4/2020 | Karmarkar ............. | G06F 16/27 |

* cited by examiner

*Primary Examiner* — Michael Pham
(74) *Attorney, Agent, or Firm* — Zilka-Kotab, P.C.

(57) ABSTRACT

A computer-implemented method, according to one embodiment, includes: receiving data replication operations from one or more compute nodes at a primary location, storing the received data replication operations in a queue, and dividing the queued data replication operations into a number of independent sub-groups. The number of independent sub-groups is equal to or less than a number of worker gateway nodes. Each of the independent sub-groups are further added to a respective one of the worker gateway nodes. One or more instructions are also sent to each of the worker gateway nodes to send the data replication operations included in the respective independent sub-group to a remote storage location. Other systems, methods, and computer program products are described in additional embodiments.

17 Claims, 10 Drawing Sheets

SCALABLE AND BALANCED DISTRIBUTION OF ASYNCHRONOUS OPERATIONS IN DATA REPLICATION SYSTEMS

BACKGROUND

The present invention relates to data storage systems, and more specifically, this invention relates to the distribution of asynchronous data write operations in data replication systems.

In current data replication systems, the application nodes on a local cluster, such as a cache cluster or "primary site", modify the data and queue the data modification operations to a gateway node. These data replication systems include one dedicated gateway node which is configured for individual filesets of the file system. Accordingly, the data modification operations of individual filesets are sent to the gateway node. The gateway node may apply various optimization techniques to the operations which are received, e.g., such as coalescing small contiguous write operations into single write operation, before sending the operations asynchronously to a remote cluster, such as a home cluster or "secondary site".

The application nodes return to the applications once data is written locally and operations are queued at the gateway node. However, the applications running on hundreds of nodes using a parallel file system send all the data modification operations to the same respective gateway node. Accordingly, the data replication performed to a remote site is constrained by resources which are available at the gateway node as well as the available network bandwidth which exists between the gateway node and the remote cluster.

SUMMARY

A computer-implemented method, according to one embodiment, includes: receiving data replication operations from one or more compute nodes at a primary location, storing the received data replication operations in a queue, and dividing the queued data replication operations into a number of independent sub-groups. The number of independent sub-groups is equal to or less than a number of worker gateway nodes. Each of the independent sub-groups are further added to a respective one of the worker gateway nodes. One or more instructions are also sent to each of the worker gateway nodes to send the data replication operations included in the respective independent sub-group to a remote storage location.

A computer program product, according to another embodiment, includes a computer readable storage medium having program instructions embodied therewith. The computer readable storage medium is not a transitory signal per se. Moreover, the program instructions are readable and/or executable by a processor to cause the processor to perform a method which includes: receiving, by the processor, data replication operations from one or more compute nodes at a primary location; storing, by the processor, the received data replication operations in a queue; and dividing, by the processor, the queued data replication operations into a number of independent sub-groups. The number of independent sub-groups is equal to or less than a number of worker gateway nodes. Each of the independent sub-groups are further added, by the processor, to a respective one of the worker gateway nodes. One or more instructions are also sent, by the processor, to each of the worker gateway nodes to send the data replication operations included in the respective independent sub-group to a remote storage location.

A system, according to yet another embodiment, includes: a processor, and logic integrated with the processor, executable by the processor, or integrated with and executable by the processor. The logic is configured to: receive, by the processor, data replication operations from one or more compute nodes at a primary location; store, by the processor, the received data replication operations in a queue; and divide, by the processor, the queued data replication operations into a number of independent sub-groups. The number of independent sub-groups is equal to or less than a number of worker gateway nodes. Each of the independent sub-groups is further added, by the processor, to a respective one of the worker gateway nodes. One or more instructions are also sent, by the processor, to each of the worker gateway nodes to send the data replication operations included in the respective independent sub-group to a remote storage location. At least some of the data replication operations are received from the one or more compute nodes at the primary location in an asynchronous fashion. Moreover, the worker gateway nodes send the data replication operations to the remote storage location in parallel to each other.

Other aspects and embodiments of the present invention will become apparent from the following detailed description, which, when taken in conjunction with the drawings, illustrate by way of example the principles of the invention.

DETAILED DESCRIPTION

Figure 1:
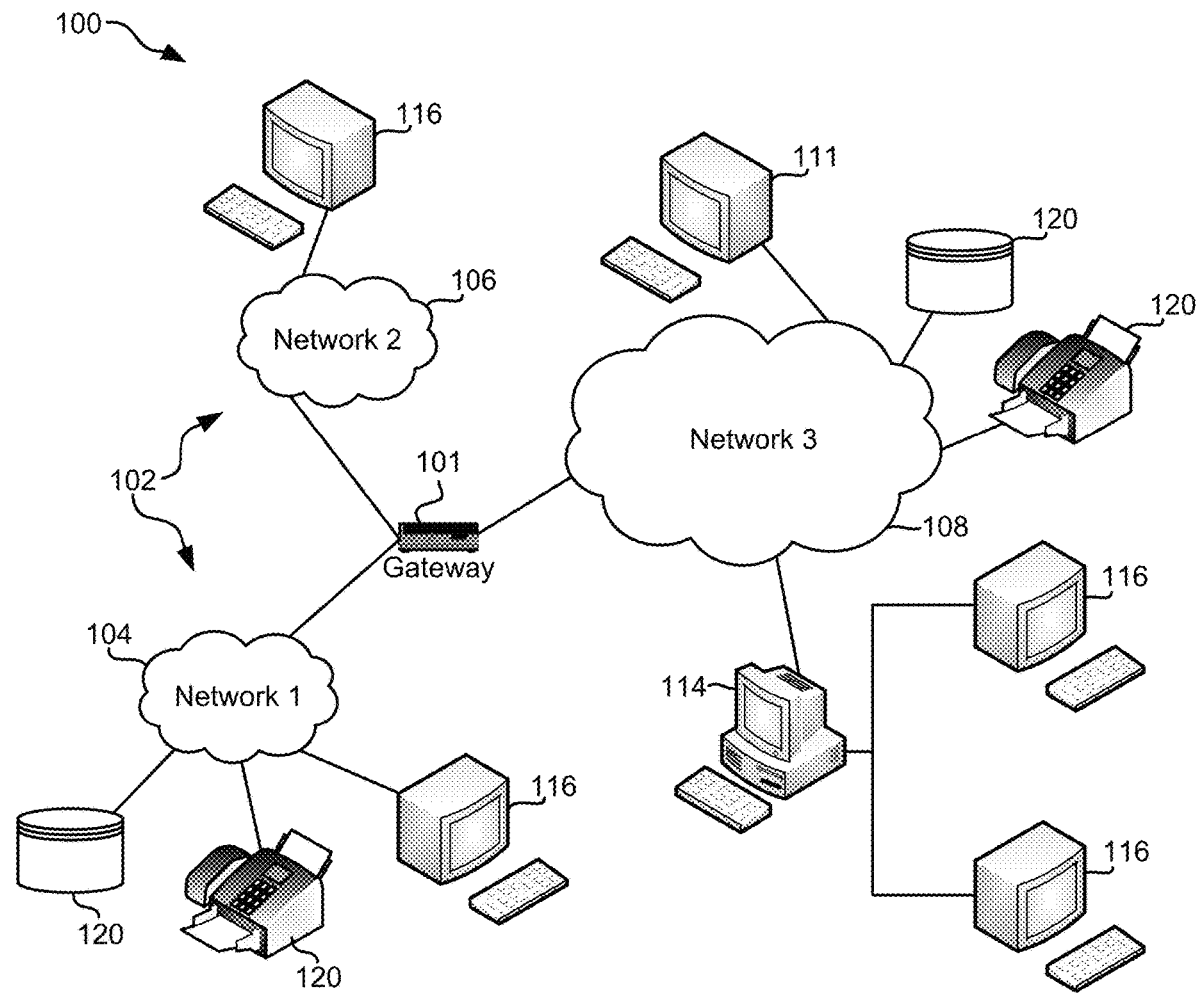
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the"

include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing a balanced distribution of asynchronous data replication operations which are queued. As a result, various ones of the approaches included herein are able to increase the speed by which data replications are performed, improve performance, decrease the amount of system resources are consumed, increase scalability of the system as a whole, etc., e.g., as will be described in further detail below.

In one general embodiment, a computer-implemented method includes: receiving data replication operations from one or more compute nodes at a primary location, storing the received data replication operations in a queue, and dividing the queued data replication operations into a number of independent sub-groups. The number of independent sub-groups is equal to or less than a number of worker gateway nodes. Each of the independent sub-groups are further added to a respective one of the worker gateway nodes. One or more instructions are also sent to each of the worker gateway nodes to send the data replication operations included in the respective independent sub-group to a remote storage location.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: receiving, by the processor, data replication operations from one or more compute nodes at a primary location; storing, by the processor, the received data replication operations in a queue; and dividing, by the processor, the queued data replication operations into a number of independent sub-groups. The number of independent sub-groups is equal to or less than a number of worker gateway nodes. Each of the independent sub-groups are further added, by the processor, to a respective one of the worker gateway nodes. One or more instructions are also sent, by the processor, to each of the worker gateway nodes to send the data replication operations included in the respective independent sub-group to a remote storage location.

In yet another general embodiment, a system includes: a processor, and logic integrated with the processor, executable by the processor, or integrated with and executable by the processor. The logic is configured to: receive, by the processor, data replication operations from one or more compute nodes at a primary location; store, by the processor, the received data replication operations in a queue; and divide, by the processor, the queued data replication operations into a number of independent sub-groups. The number of independent sub-groups is equal to or less than a number of worker gateway nodes. Each of the independent sub-groups is further added, by the processor, to a respective one of the worker gateway nodes. One or more instructions are also sent, by the processor, to each of the worker gateway nodes to send the data replication operations included in the respective independent sub-group to a remote storage location. At least some of the data replication operations are received from the one or more compute nodes at the primary location in an asynchronous fashion. Moreover, the worker gateway nodes send the data replication operations to the remote storage location in parallel to each other.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
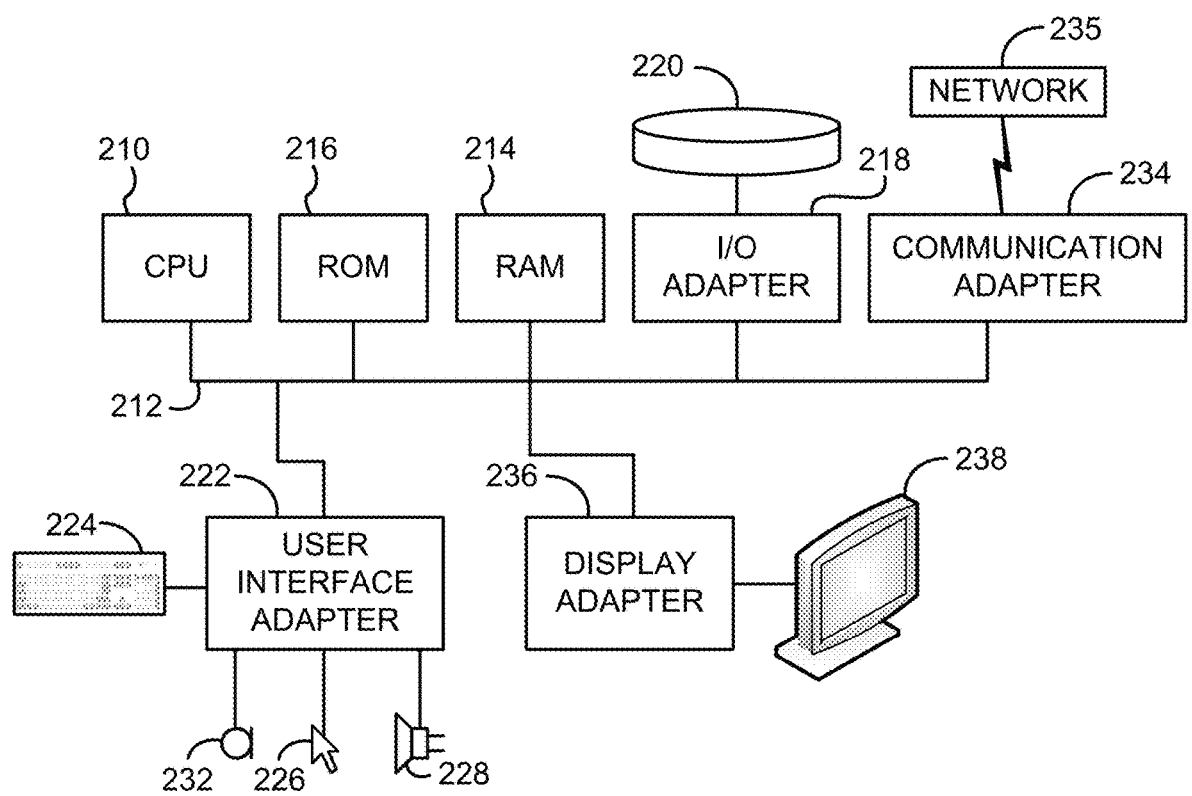
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
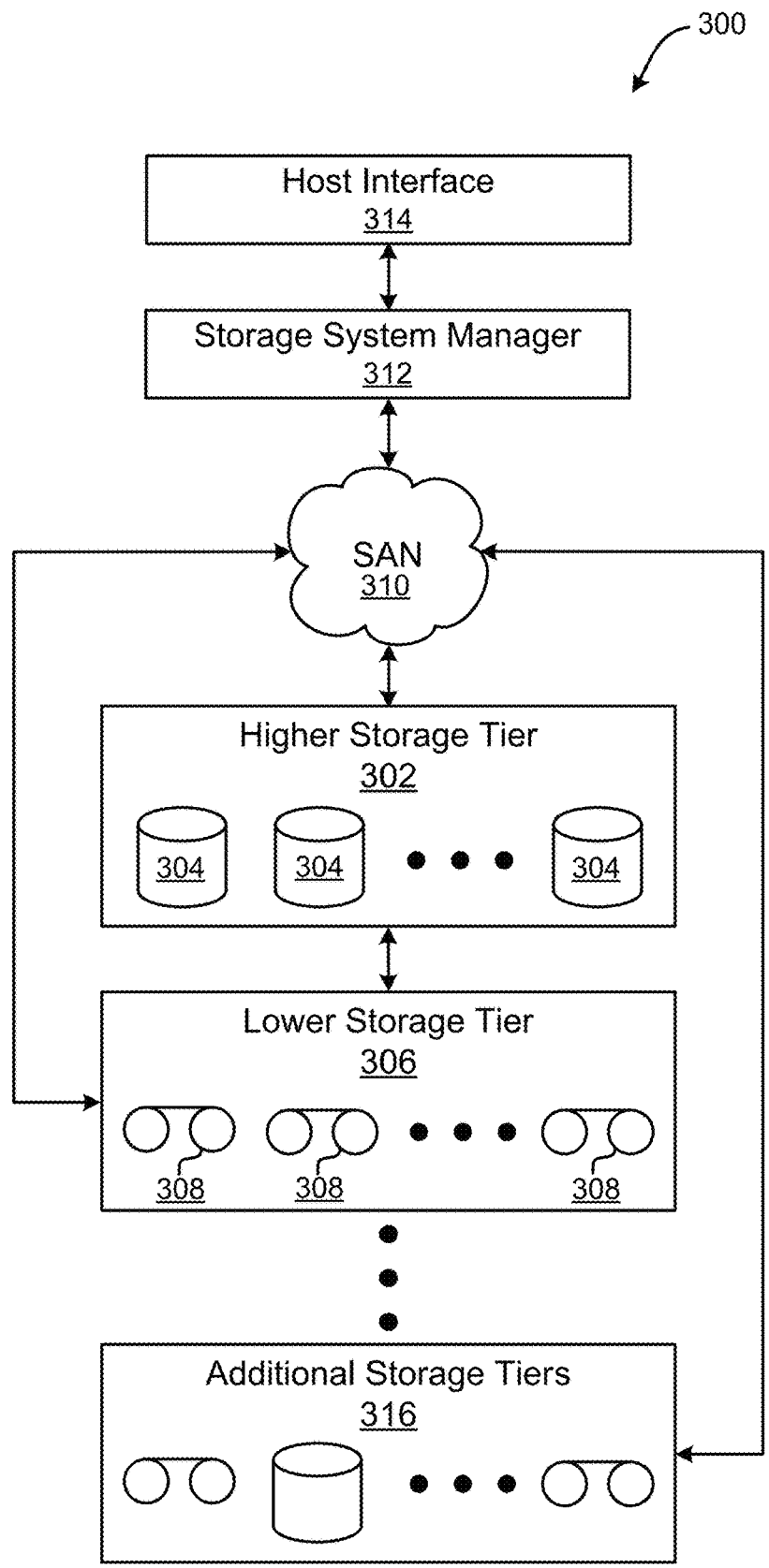
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, in conventional data replication systems, the application nodes on a local cluster, such as a cache cluster or "primary site", modify the data and queue the data modification operations to a gateway node. These data replication systems include one dedicated gateway node which is configured for individual filesets of the file system. Accordingly, the data modification operations of individual filesets are sent to the gateway node. The gateway node may apply various optimization techniques to the operations which are received, e.g., such as coalescing small contiguous write operations into single write operation, before sending the operations asynchronously to a remote cluster, such as a home cluster or "secondary site".

The application nodes return to the applications once data is written locally and operations are queued at the gateway node. However, the applications running on hundreds of nodes using a parallel file system send all the data modification operations to the same respective gateway node. Accordingly, the data replication performed to a remote site is constrained by resources which are available at the gateway node as well as the available network bandwidth which exists between the gateway node and the remote cluster.

This bottleneck often causes over usage of resources at the gateway node (e.g., such as memory used by the queue) and causes the gateway node to crash. When the gateway node comes back online after a crash, it runs recovery operations in an effort to queue all of the pending operations which were in the queue at the time of the crash. However, this again results in the over usage of the available resources, thereby causing the system to crash again. Accordingly, conventional data replication systems suffer from prolonged periods of inoperability as a result of being unable to successfully recover the gateway node.

In sharp contrast to the aforementioned shortcomings experienced by conventional data replication systems, various ones of the embodiments included herein are able to distribute asynchronously received operations among a set of gateway nodes which correspond to a local cluster. This set of gateway nodes are thereby able to replicate the data included in the various asynchronous operations in parallel. Moreover, by distributing the various operations among multiple gateway nodes, each gateway node receives subsets of operations based on current workload of the individual gateway nodes and/or the network bandwidth from those gateway nodes to a remote cluster, e.g., as will be described in further detail below.

Figure 4A:
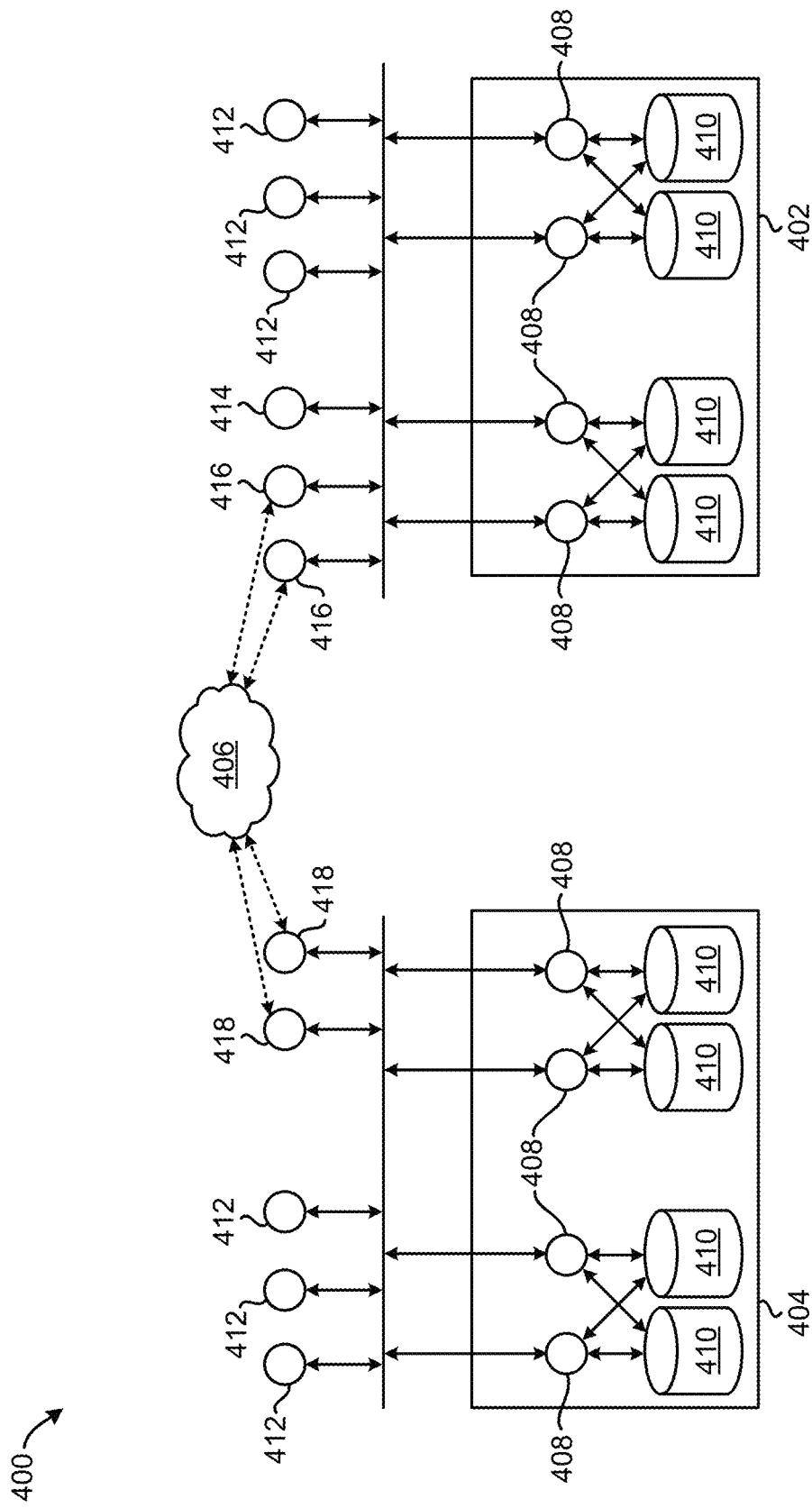
FIG. 4A is partial representational view of a distributed storage system in accordance with one embodiment.

Looking to FIG. 4A, a distributed storage system 400 is illustrated in accordance with one embodiment. As an option, the present storage system 400 may be implemented in conjunction with features from any other embodiment listed herein, such as those described with reference to the other FIGS. However, such storage system 400 and others presented herein may be used in various applications and/or in permutations which may or may not be specifically described in the illustrative embodiments listed herein. Further, the storage system 400 presented herein may be used in any desired environment. Thus FIG. 4A (and the other FIGS.) may be deemed to include any possible permutation.

As shown, the distributed storage system 400 includes a primary site 402 and a secondary site 404 which are connected by a network 406. According to some approaches, the primary site 402 may be considered as being a "cache cluster", while the secondary site 404 is considered a "home cluster", e.g., as would be appreciated by one skilled in the art.

The network 406 may be of any type, e.g., depending on the desired approach. For instance, in some approaches the network 406 is a WAN, e.g., such as the Internet. However, an illustrative list of other network types which network 406 may implement includes, but is not limited to, a LAN, a PSTN, a SAN, an internal telephone network, etc. Accordingly, the primary site 402 and the secondary site 404 are able to communicate with each other regardless of the amount of separation which exists therebetween, e.g., despite being positioned at different geographical locations.

Both the primary site 402 and the secondary site 404 include a number of data access nodes 408 which are coupled to various data storage devices 410. In some approaches, one or more of the data access nodes 408 serve as virtual machines which provide access to data stored in the distributed storage system 400. Thus, various ones of the data access nodes 408 may implement (e.g., run) any number of applications. According to an illustrative approach, which is in no way intended to limit the invention, one or more of the data access nodes 408 serve as a migration client which issues read operations, write operations, update operations, etc. received from a user and/or application being run thereby.

Moreover, in some approaches, each of the data storage devices 410 at each of the respective sites 402, 404 are of a same type of storage, e.g., SSD, HDD, magnetic tape, etc. According to an illustrative example, each of the data storage devices 410 at the primary site 402 include SSDs, while each of the data storage devices 410 at the secondary site 404 include HDDs. However, in other approaches the various storage devices 410 at either of the respective sites may include more than one different type of storage.

Each of the data access nodes 408 are also in communication with a several different node types. For instance, data access nodes 408 at both the primary site 402 and the secondary site 404 are coupled to a plurality of compute nodes 412. Looking specifically to the primary site 402, the compute nodes 412 may currently be running one or more applications. Each of these compute nodes at the primary site 402 are also coupled to a master gateway node 414 which in turn is coupled to more than one different worker gateway nodes 416. It follows that in some approaches the compute nodes 412 send I/O operations which are executed at the primary site 402 (e.g., by the storage nodes 408) to the master gateway node 414 using any desired remote procedure call (RPC).

Once the I/O operations are sent to the master gateway node 414, the compute nodes 412 at the primary site 402 return to performing the respective applications being performed thereon. However, the master gateway node 414 stores the asynchronous data replication operations received form the compute nodes 412 in a queue. Accordingly, although now shown in FIG. 4A, the master gateway node 414 includes a queue in some approaches. The queue may manage the received operations according to any desired structure. For instance, in some approaches the queue processes the operations received in a first-in-first-out (FIFO) manner. However, in other approaches the processes the operations received in a last-in-first-out (LIFO) manner.

The master gateway node 414 also applies various optimization techniques on the asynchronous operations in some approaches. For example, the master gateway node 414 coalesces smaller, contiguous write operations into a single, larger write operation while removing negatable operations, e.g., such as file create operations which are followed by file removal operations, e.g., as will be described in further detail below with respect to FIG. 4B.

With continued reference to FIG. 4A, each of the worker gateway nodes 416 at the primary site 402 are paired (e.g., matched) with a corresponding I/O node 418 at the secondary site 404. Accordingly, asynchronous data replication operations which are queued at the master gateway node 414 can be distributed across the multiple worker gateway nodes 416, and then sent to the corresponding I/O nodes 418. Thus, the data replication operations are transferred from the primary site 402 to the secondary site 404 in an efficient manner which also actively avoids system crashes by distributing the processing load. The achievable throughput of the system is also increased as a result of implementing multiple worker gateway and I/O node pairs 416, 418 which are capable of sending data replication operations simultaneously and in parallel.

Upon receiving data replication operations, the I/O nodes 418 at the secondary site communicate with the data access nodes 408 such that data stored in the various storage devices 410 is updated accordingly. As a result, the secondary site 404 serves as a backup for the data stored at the primary site 402, e.g., for data retention purposes. Thus, any updates, deletes, overwrites, new writes, etc. performed at the primary site 402 and/or elsewhere in the distributed storage system 400 are reflected at the secondary site 404.

It should be noted that the embodiment illustrated in FIG. 4A may include more or fewer components depending on the desired approach. For instance, the system 400 includes one or more servers at each of the primary and secondary sites 402, 404 in some approaches. In some approaches, the data access nodes 408 may be coupled to a server using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. Moreover, the process of forming a communication link between any one or more of the data access nodes 408, a server (not shown), the compute nodes 412, the master gateway node 414, the worker gateway nodes 416, the I/O nodes 418, etc., may implement any protocols and/or processes which would be apparent to one skilled in the art after reading the present description.

Again, various ones of the embodiments included herein are able to distribute asynchronously received operations among a set of gateway nodes which correspond to a local cluster. This set of gateway nodes are thereby able to replicate the data included in the various asynchronous operations in parallel. Moreover, by distributing the various operations among multiple gateway nodes, each gateway node receives subsets of operations based on current workload of the individual gateway nodes and/or the network bandwidth from those gateway nodes to a remote cluster.

Figure 4B:
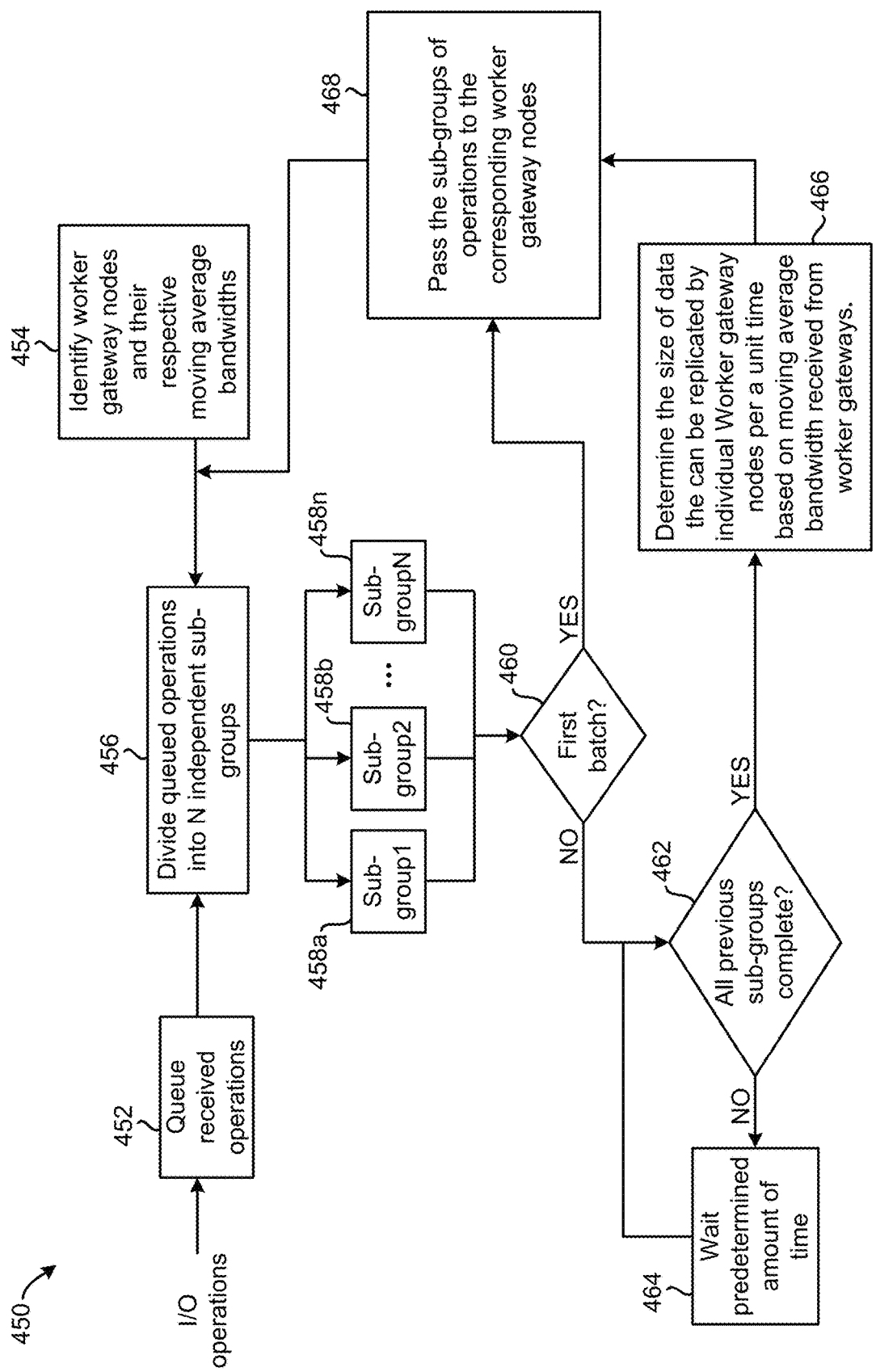
FIG. 4B is a flowchart of a method in accordance with one embodiment.

Looking now to FIG. 4B, a flowchart of a method 450 is shown according to one embodiment. The method 450 may be performed in accordance with the present invention in any of the environments depicted in FIGS. 1-4A, among others, in various embodiments. Of course, more or less operations than those specifically described in FIG. 4B may be included in method 450, as would be understood by one of skill in the art upon reading the present descriptions.

Each of the steps of the method 450 may be performed by any suitable component of the operating environment. For example, one or more of the processes included in method 450 are performed by the master gateway node at a primary storage site. However, in various other embodiments, the method 450 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 450. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4B, various I/O operations are received from one or more different compute nodes. The compute nodes send these I/O operations to the master gateway node as they are executed at the primary site (e.g., local cluster) in some approaches using RPCs. Once the IO operations are sent to the master gateway node, the compute nodes return to performing their respective applications.

As these I/O operations are received at the master gateway node, operation 452 includes actually storing them in a queue. In other words, the master gateway node queues the asynchronous data replication operations received form one or more different compute nodes. The master gateway node also applies various optimization techniques on the asynchronous operations in some approaches, e.g., as mentioned above.

Looking to operation 454, the master gateway node also determines a set of worker gateway nodes which are configured on the local cluster and which are also connected to a remote cluster through networks such as WAN, LAN, SAN, etc. Moreover, operation 454 includes determining the moving average bandwidth for the set of worker gateway nodes. This moving average bandwidth may be subsequently used to determine a portion of the queued I/O operations to assign to each of the worker gateway nodes in the interest of increased parallelism and throughput while also reducing overall performance times, e.g., as will be described in further detail below.

Moving to operation 456, the master gateway node builds sets of sub-groups from the queued operations as they are accumulated, such that each of these sub-groups can be executed independently. This is performed in some approaches by dividing the queued I/O operations into N independent sub-groups which correspond to the N worker gateway nodes identified in operation 454. Accordingly, the master gateway node builds sub-groups in some approaches such that each of the sub-groups have a same (or at least similar) size of data to be replicated thereby, e.g., as seen in operations 458a, 458b . . . 458n. In some approaches, the size of each of the sub-groups depends on the amount of time it takes the worker gateway nodes to replicate each of the sub-groups, e.g., as would be appreciated by one skilled in the art after reading the present description.

Decision 460 further includes determining whether the batch of sub-groups formed in operations 458a, 458b . . . 458n correspond to a first batch. In other words, decision 460 determines whether any batches of sub-groups have previously been formed, e.g., in a previous iteration of method 450 for instance. In response to determining that the present batch of sub-groups is not the first batch formed, decision 462 includes determining whether all previous batches of sub-groups have been completed. Moreover, in response to determining that all previous batches of sub-groups have not yet been completed, operation 464 allows a predetermined (e.g., preprogrammed) amount of time to elapse before reperforming decision 462. Accordingly, decision 462 and operation 464 may be repeated in a recursive fashion until it is determined that all previous batches of sub-groups have been completed.

Method 450 proceeds to operation 466 in response to determining that all previous batches of sub-groups have been completed. There, operation 466 includes determining the size of data that can be replicated by an individual worker gateway node per a given unit of time. Moreover, this determination is preferably made based on a moving average bandwidth which is received from the various worker gateway nodes. In other words, the moving average bandwidth of the worker gateway nodes are used to build sub-groups proportional to their moving average bandwidths.

Accordingly, a determination may be made as to whether the size of each of the sub-groups is appropriate for the respective worker gateway node to which it will be assigned (e.g., added to) based on their respective computational capacity, the available network bandwidth, system resources, etc. This is preferred as worker gateway nodes having higher throughputs, better (e.g., faster) network connections, higher computational abilities, etc. are assigned sub-groups of operations which are larger than the sub-groups which are assigned to worker gateway nodes having lower throughputs, slower network connections, lower computational abilities, etc., at least in comparison to each other. As a result, the higher performing worker gateway nodes are able to transfer more operations to the secondary site in the same amount of time as the relatively lower performing worker gateway nodes, thereby allowing the various worker gateway nodes to operate in parallel while also ensuring that each of them send their respective sub-group of operations in substantially the same amount of time. This reduces latency, minimizes network bandwidth usage, increases performance rates, decreases computational resources consumed, etc., as would be appreciated by one skilled in the art after reading the present description.

From operation 466, method 450 proceeds to operation 468. However, it should be noted that method 450 also proceeds to operation 468 from decision 460 in response to determining that the present batch of sub-groups is the first batch formed, as no previous performance information is available to assist in performing operation 468. Looking to operation 468, here method 450 includes using protocols (e.g., such as RPC) to pass each of the sub-groups to a corresponding one of the worker gateway nodes. Accordingly, sub-group1 is passed (e.g., allocated) to a first worker gateway node, sub-group2 is passed to a second worker gateway node, and so on until sub-groupN is passed to an $n^{th}$ worker gateway node. Each of the operations in the individual sub-groups are sent to the corresponding worker gateway noes using separate RPCs in some approaches.

From operation 468, method 450 returns to operation 456. Thus, once the sub-groups of I/O operations have been distributed to each of the worker gateway nodes, the master gateway node preferably begins building a next set of sub-groups from a main queue. Accordingly, various ones of the processes included in method 450 are repeated in a recursive fashion in order to process the various I/O operations received during operation of the overarching distributed storage system.

As mentioned above, the worker gateway nodes at a primary site receive the corresponding sub-groups of queued operations and execute them by replicating the data to the I/O nodes at a secondary site. Looking now to FIG. 4C, the processes of handling the sub-groups of queued operations is presented in further detail for a given worker gateway node in accordance with one embodiment. These processes may be performed in accordance with the present invention in any of the environments depicted in FIGS. 1-4B, among others, in various embodiments. Of course, more or less operations than those specifically described in FIG. 4C may be included in the processes, as would be understood by one of skill in the art upon reading the present descriptions.

Each of the processes may be performed by any suitable component of the operating environment. For example, one or more of the processes are performed by the master gateway node at a primary storage site. However, in various other embodiments, the processes may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more of the processes. Illustrative processors include, but are not limited to, a central processing unit (CPU), an application specific integrated circuit (ASIC), a field programmable gate array (FPGA), etc., combinations thereof, or any other suitable computing device known in the art.

Figure 4C:
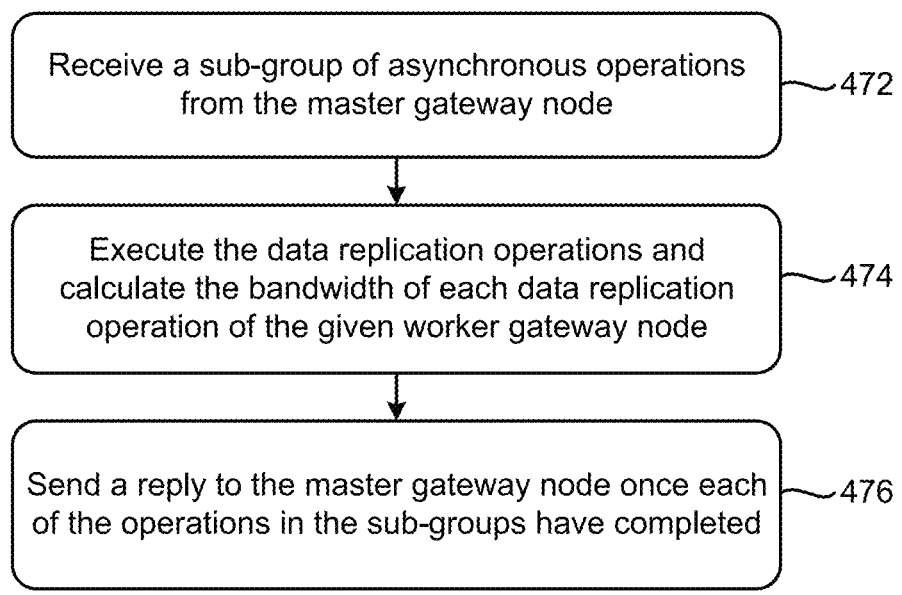
FIG. 4C is a flowchart of a method in accordance with one embodiment.

As shown in FIG. 4C, operation 472 includes receiving a sub-group of asynchronous operations from the master gateway node. Upon receiving the sub-group, operation 474 includes executing the data replication operations and calculate the bandwidth of each data replication operation of the given worker gateway node. The worker gateway nodes may further calculate the moving average of application level bandwidths in some approaches while data is being replicated to an I/O node at the secondary site. For example, Equation 1 is used in some approaches to calculate the moving average bandwidth as follows:

$$\text{Moving Average Bandwidth} = \frac{\sum \text{Data size of individual operations}}{\sum \text{Time to replace data}} \quad \text{Equation 1}$$

Moreover, looking to operation 476, once each of the operations in the sub-groups have completed, the worker gateway nodes send a reply to the master gateway node. The reply informs the master gateway node that the sub-group of operations have been completed, and that the corresponding moving average of the bandwidth has been computed.

Once the gateway node has received such a reply from each of the worker gateway nodes which had operation sub-groups allocated thereto, the master gateway node sends a subsequent batch of operation sub-groups to each of the worker gateway nodes. The master gateway node also uses the received moving average bandwidth of the worker gateway nodes in some approaches to construct (e.g., organize) subsequent batches of operation sub-groups. This helps avoid situations in which certain worker gateway nodes are overloaded while other worker gateway nodes remain idle. Accordingly, the worker gateway nodes are assigned sub-groups of operations in a balanced manner based on resources available to the worker gateway nodes.

Figure 5:
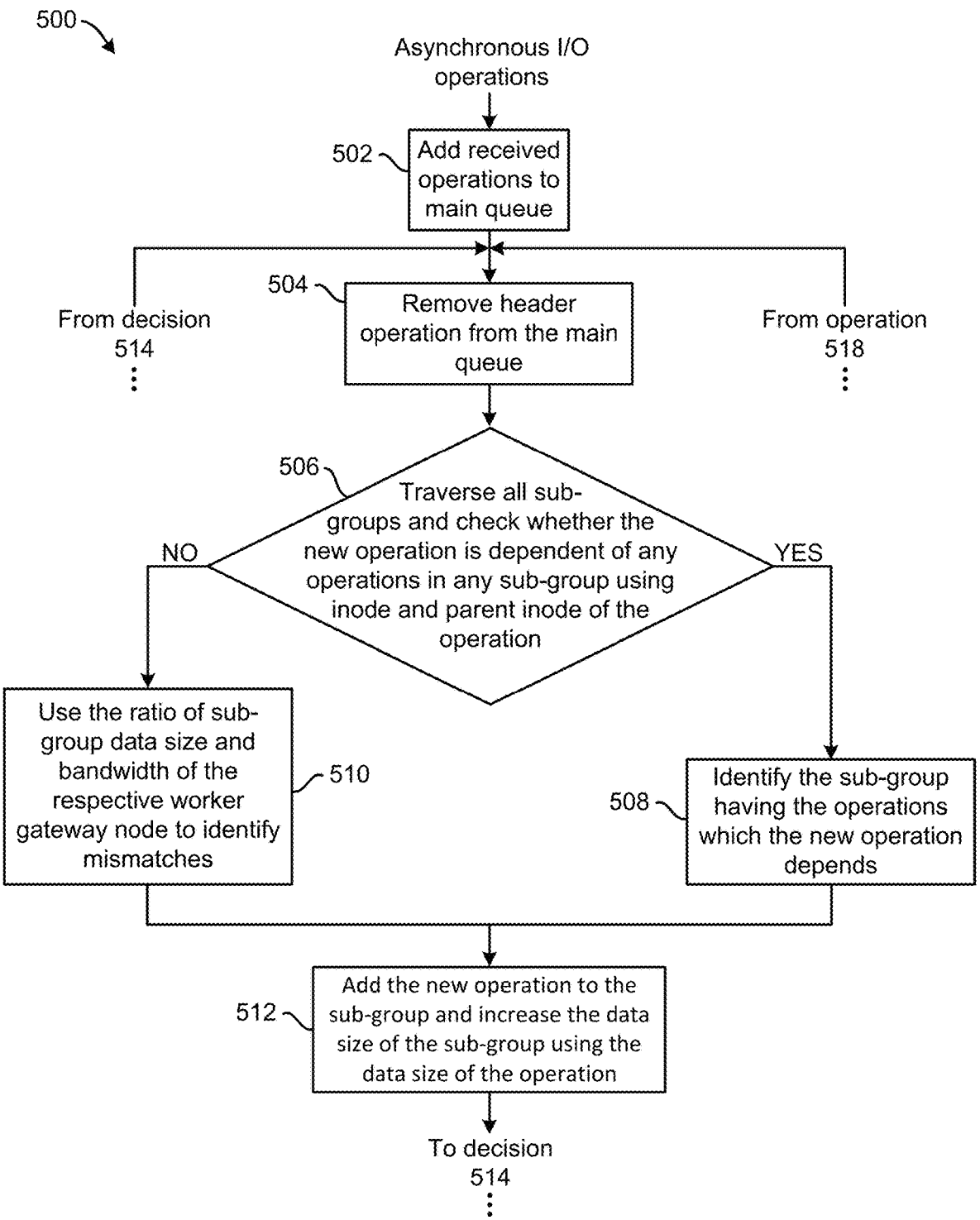
FIG. 5 is a flowchart of a method in accordance with one embodiment.
Figure 5:
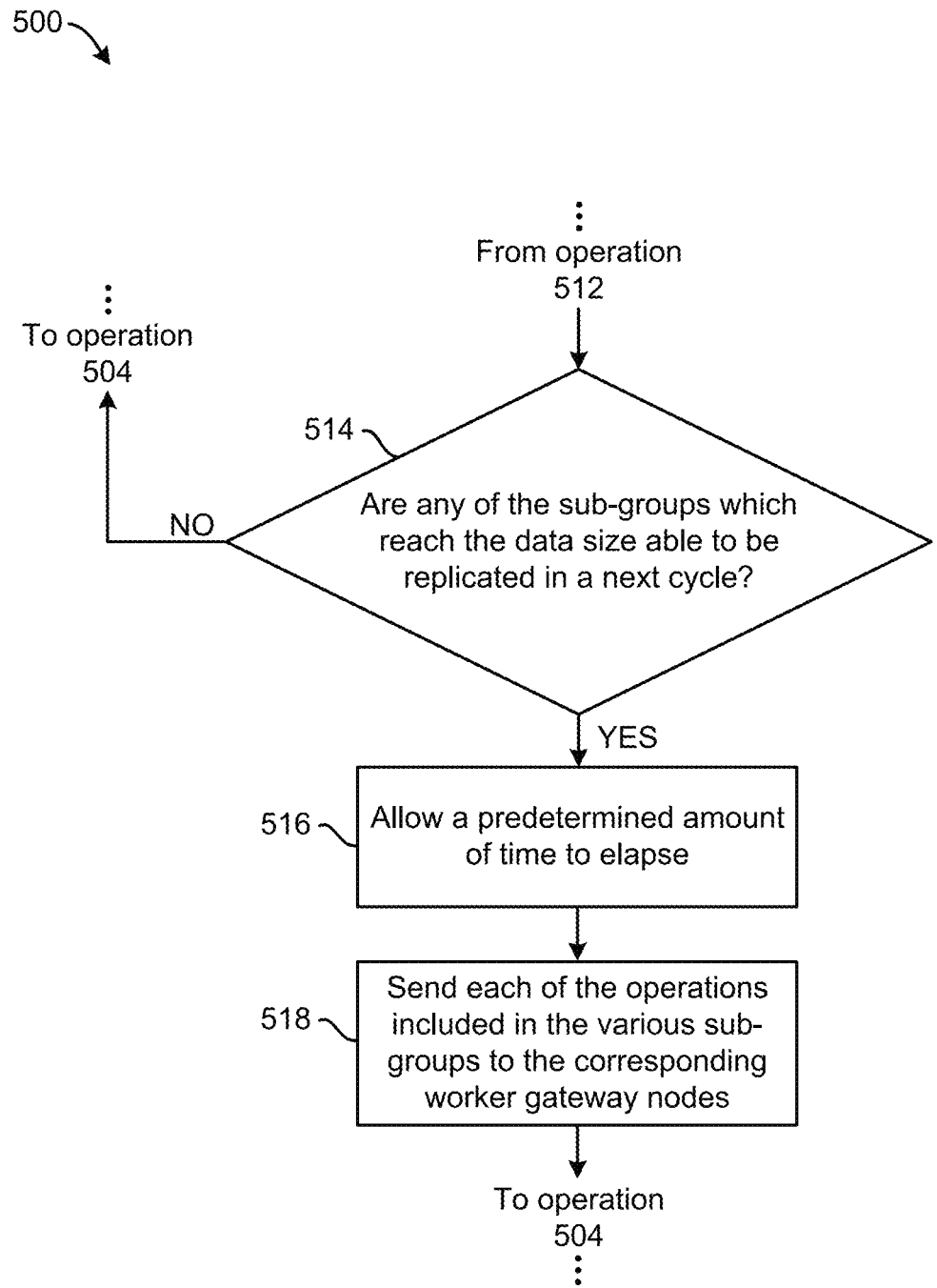

Referring now to FIG. 5, the flowchart of a method 500 of forming the various sub-groups of operations is illustrated in accordance with one embodiment. The method 500 may be performed in accordance with the present invention in any of the environments depicted in FIGS. 1-4C, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, one or more of the processes included in method 500 are performed by the master gateway node at a primary storage site. However, in various other embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown, asynchronous I/O operations are received and added to a main queue. See operation 502. Progressing to operation 504, the header operation of the main queue is removed, which allows for the data size of the operation to be determined. Accordingly, decision 506 includes traversing each of the sub-groups and determining whether the new operation is dependent of any operations in any other of the sub-groups. In some approaches, this determination is made using the inode and/or parent inode which corresponds to the operation. For approaches in which the operation is a metadata operation, a fixed data size is used.

Using the inode number and/or the corresponding parent inode number of the given operation, each of the sub-groups are evaluated in parallel. The evaluation preferably determines whether the new operation is dependent of any operations of any other sub-group as mentioned above. In response to determining that a sub-group contains some operations which depend on the new operation, method 500 proceeds to operation 508. There, operation 508 includes identifying the sub-group which includes operations that the new operation depends on. However, in response to determining that the sub-group does not contain operations which depend on the new operation, method 500 proceeds to operation 510. As shown, operation 510 includes using the ratio between sub-group data size and bandwidth of the respective worker gateway node to identify the sub-group of worker gateway nodes which may complete early. In other words, operation 510 includes determining whether the size of any of the sub-group of operations is disproportional to the computational abilities of the worker gateway node to which it has been added.

Method 500 proceeds to operation 512 from operation 508 as well as operation 510. There, operation 512 includes adding the new operation to the sub-group determined as containing some operations which depend on the new operation. Moreover, and the data size of that sub-group is increased by the data size of new operation. If the new operation is not dependent of any operations of any sub-group, then the new operation is added to a sub-group which takes less time to replicate the data of its operations in the respective sub-group to the secondary site. As a result, the dependent operations are desirably executed at the secondary site in the same order they were executed at the primary site. Moreover, the independent operations are distributed to multiple worker gateway nodes when possible, e.g., such that execution time of all sub-groups is substantially similar.

Decision 514 further includes determining whether any of the sub-groups which reach the data size are able to be replicated in a next cycle. In response to determining that one or more of the sub-groups which reach the data size are able to be replicated in a next cycle, method 500 proceeds to operation 516 where a predetermined (e.g., preprogrammed) amount of time is allowed to elapse before progressing to operation 518. There, operation 518 includes sending each of the operations included in the various sub-groups to the corresponding worker gateway nodes, before returning to operation 504. Returning to decision 514, method 500 also returns to operation 504 in response to determining that none of the sub-groups which reach the data size are able to be replicated in a next cycle.

Accordingly, various ones of the processes included in method 500 may be repeated in a recursive fashion as I/O operations are asynchronously received over time and accumulated in the main queue. It should also be noted that the data size of sub-groups for each worker gateway node can differ based on the bandwidth and/or performance of the respective worker gateway node, but the data replication time of each sub-group remains substantially similar.

Figure 6A:
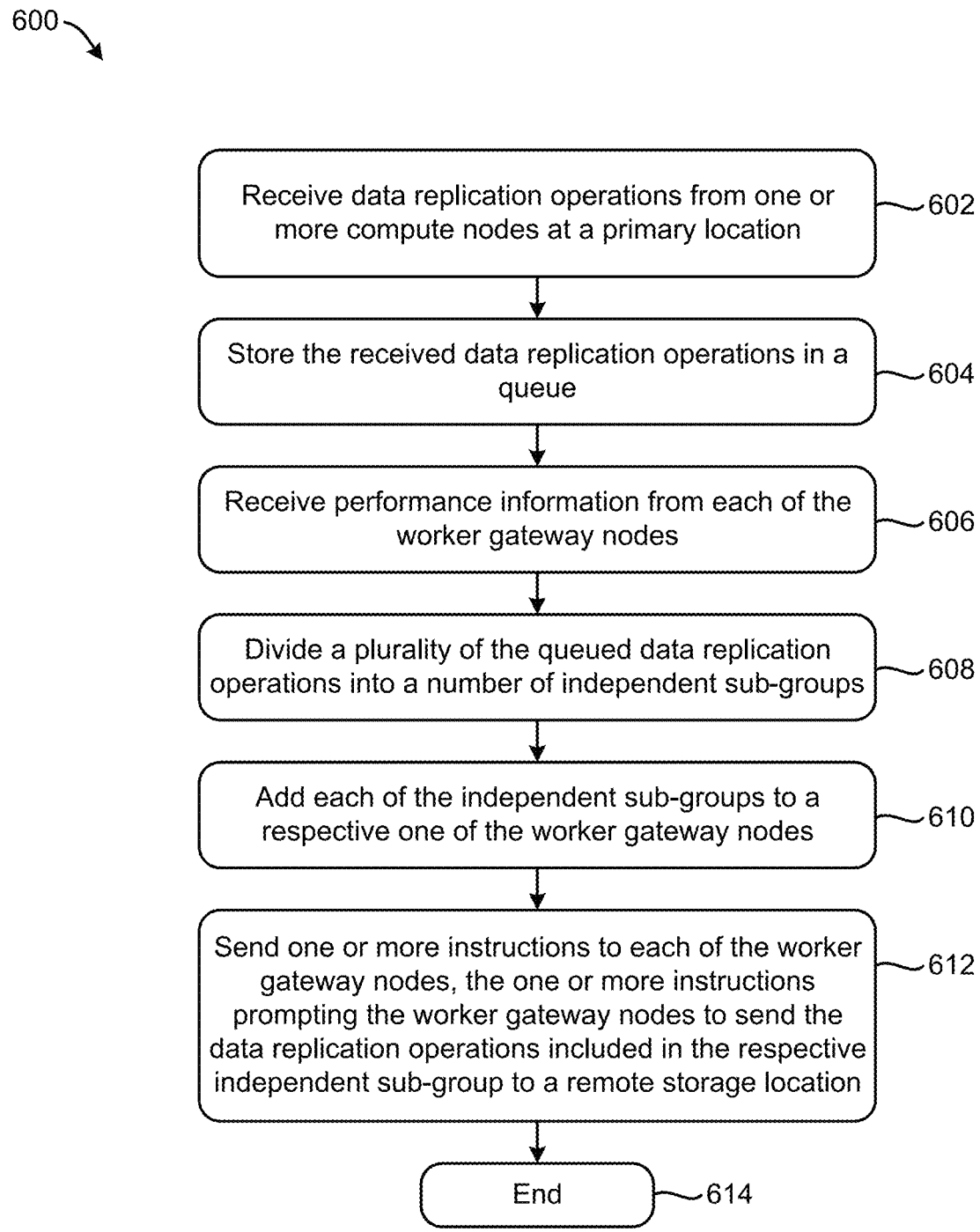
FIG. 6A is a flowchart of a method in accordance with one embodiment.

Looking now to FIG. 6A, a flowchart of another method 600 is shown according to one embodiment. The method 600 may be performed in accordance with the present invention in any of the environments depicted in FIGS. 1-5, among others, in various embodiments. Of course, more or less operations than those specifically described in FIG. 6A may be included in method 600, as would be understood by one of skill in the art upon reading the present descriptions.

Each of the steps of the method 600 may be performed by any suitable component of the operating environment. For example, as mentioned above, one or more of the processes included in method 600 are performed by the master gateway node at a primary storage site (e.g., see master gateway node 414 in FIG. 4A above) and/or a controller, processor, computer, etc. coupled thereto. Thus, in some embodiments, method 600 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6A, operation 602 of method 600 includes receiving data replication operations from one or more compute nodes at a primary location. As mentioned above, in some approaches one or more data access nodes (e.g., storage nodes) communicate with one or more compute nodes at a primary site. The one or more compute nodes may further communicate with a master gateway node. Accordingly, data replication operations pertaining to data stored at the primary site are received at the master gateway node in some approaches from one or more compute nodes and/or data access nodes at the primary site. Moreover, the data replication operations are typically received in an asynchronous fashion, e.g., as they are performed, but is in no way limited thereto. However, it should be noted that none of the worker gateway nodes are dedicated to a specific fileset and/or filesystem in preferred approaches.

Looking to operation 604, the received data replication operations are stored (e.g., accumulated) in a queue. Accordingly, the queue is preferably accessible to the various nodes at the primary site. The size (e.g., storage capacity) of the queue also varies depending on the size of the overall storage system, anticipated throughputs, user specifications, industry standards, etc.

Furthermore, operation 606 includes receiving performance information from each of the worker gateway nodes, while operation 608 includes dividing a plurality of the queued data replication operations into a number of independent sub-groups. The number and/or size of the independent sub-groups which the queued data replication operations are divided into varies based on a number of factors. For instance, the number of operations which are allowed to accumulate in the queue before operation 608 is performed (or re-performed in subsequent iterations) affects the size and/or number of independent sub-groups which are formed in some approaches. A number of worker gateway nodes included at the primary site also has an effect on the size and/or number of independent sub-groups formed. In fact, the number of independent sub-groups is preferably equal to or less than a number of worker gateway nodes which are included at the primary site. As a result, the full computational throughput of the primary site may be utilized, thereby maximizing performance and reducing latency, e.g., as will soon become apparent.

However, in preferred approaches, the number and/or size of the independent sub-groups which are formed from the queued data replication operations is based at least in part on the performance information received in operation 606. For instance, in some approaches the performance information includes an updated moving average bandwidth of each of the respective worker gateway nodes in some approaches. Accordingly, the number of the queued data replication operations divided into each of the respective independent sub-groups is based at least in part on the updated moving average bandwidth of the corresponding worker gateway node in some approaches. In other words, the number of data replication operations added to each of the independent sub-groups may be different, e.g., depending on the performance of the respective worker gateway nodes. As a result, the various worker gateway nodes are preferably able to transfer the various operations included in the sub-groups to the secondary site in a reduced amount of total time. Moreover, computing resources are preserved by ensuring that the operations are transferred between sites in an efficient manner which dynamically adjusts based on actual performance over time, e.g., as would be appreciated by one skilled in the art after reading the present description.

With continued reference to FIG. 6A, operation 610 further includes adding each of the independent sub-groups to a respective one of the worker gateway nodes. As mentioned above, the number of independent sub-groups is preferably equal to or less than a number of worker gateway nodes which are included at the primary site. Accordingly, a sub-group may be added to each of the respective worker gateway nodes in preferred approaches. In approaches where the number of sub-groups is greater than the number of worker gateway nodes, at least some of the sub-groups may be temporarily retained in memory. Moreover, as worker gateway nodes become available again, additional ones of the retained sub-groups may be added to the available worker gateway nodes.

It follows that one or more instructions are sent to each of the worker gateway nodes, the one or more instructions prompting the worker gateway nodes to send the data replication operations included in the respective independent sub-group to a remote storage location. See operation 612. Moreover, the worker gateway nodes preferably send the data replication operations included in the respective independent sub-groups to the remote storage location in parallel to each other. In other words, the various worker gateway nodes preferably send their respective data replication operations one at a time to the remote storage location, but in parallel to each other. Again, this desirably increases throughput while also decreasing system latency and computational resource consumption.

From operation 612, the flowchart of FIG. 6A proceeds to operation 614, whereby method 600 may end. However, it should be noted that although method 600 may end upon reaching operation 614, any one or more of the processes included in method 600 may be repeated in order to transfer additional data replication operations. In other words, any one or more of the processes included in method 600 may be repeated in an iterative fashion as the queue in which the data replication operations continued to be accumulated fills over time.

Figure 6B:
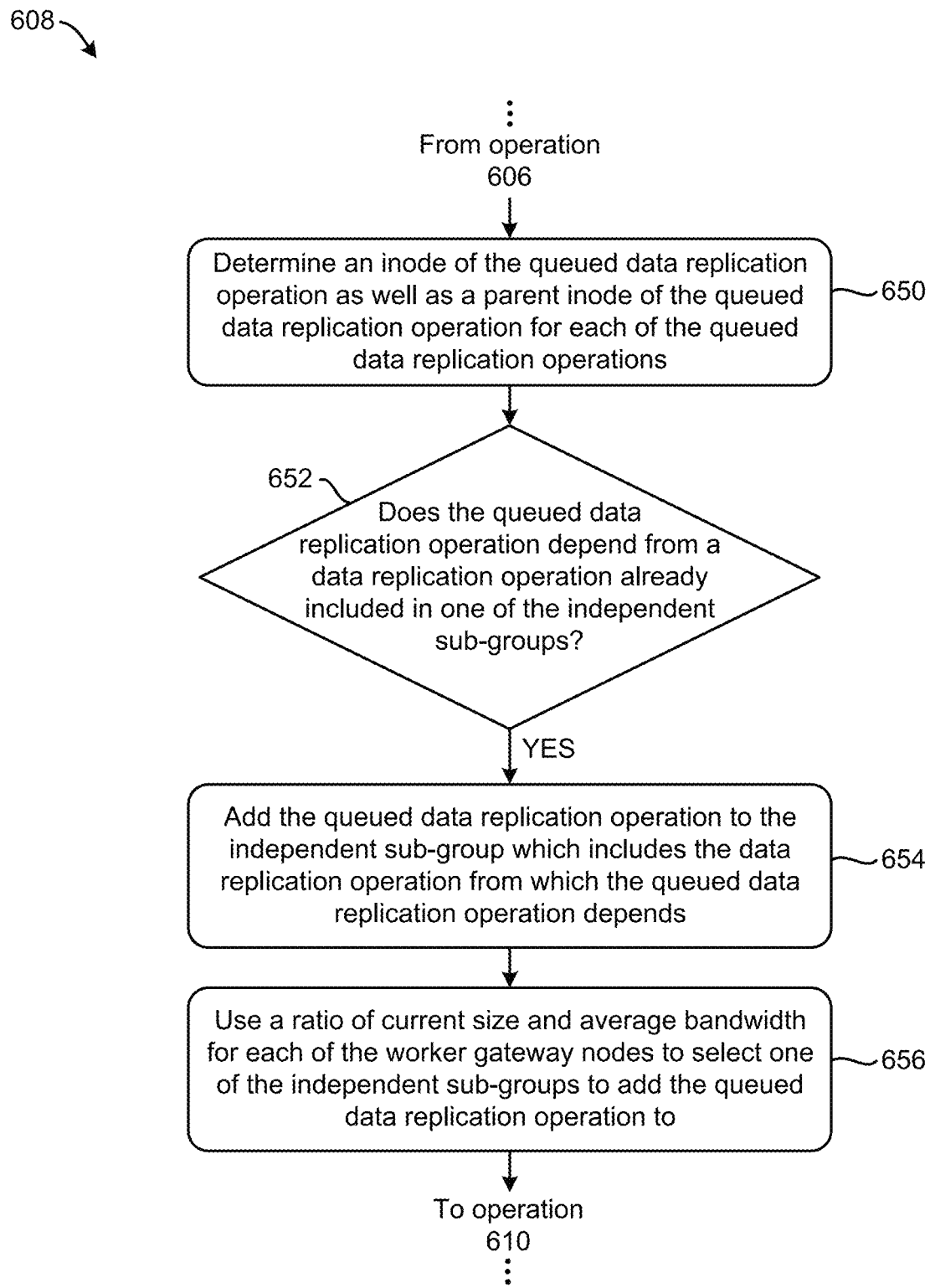
FIG. 6B is a flowchart of sub-processes for one of the operations in the method of FIG. 6A, in accordance with one embodiment.

As mentioned above, the number and/or size of the independent sub-groups which are formed from the queued data replication operations is preferably based at least in part on the performance information received. Looking to FIG. 6B, exemplary sub-processes of dividing multiple ones of the queued data replication operations into a number of independent sub-groups are illustrated in accordance with one embodiment, one or more of which may be used to perform operation 608 of FIG. 6A. However, it should be noted that the sub-processes of FIG. 6B are illustrated in accordance with one embodiment which is in no way intended to limit the invention. For instance, some of the sub-processes included in the flowchart of FIG. 6B are similar to those included in FIG. 5 above. Accordingly, any one or more of the approaches described above may be implemented in order to perform the various sub-processes included in FIG. 6B, e.g., as would be appreciated by one skilled in the art after reading the present description.

As shown, sub-operation 650 includes determining an inode of the queued data replication operation as well as a parent inode of the queued data replication operation for each of the queued data replication operations. In preferred approaches the queued data replication operations are examined in a FIFO manner. However, in other approaches the queued data replication operations may be examined in a LIFO manner, or any other desired type of ordered or unordered scheme.

Moreover, decision 652 includes using the inode and parent inode to determine whether the queued data replication operation depends from a data replication operation already included in one of the independent sub-groups. In response to determining that the queued data replication operation depends from a data replication operation already included in one of the independent sub-groups, the flowchart proceeds to sub-operation 654. There, sub-operation 654 includes adding the queued data replication operation to the independent sub-group which includes the data replication operation from which the queued data replication operation depends. Accordingly, it should be noted that in preferred approaches, no two or more queued data replication operations which depend on each other are added to different ones of the independent sub-groups.

Returning to decision 652, the flowchart proceeds to sub-operation 656 in response to determining that the queued data replication operation does not depend from a data replication operation already included in one of the independent sub-groups. There, sub-operation 656 includes using a ratio of current size (e.g., the size of all operations which have already been added to the given sub-group) and average bandwidth for each of the worker gateway nodes to select one of the independent sub-groups to add the queued data replication operation to. For instance, in some approaches Equation 1 as described above may be implemented in order to perform at least a portion of sub-operation 656.

It follows that various ones of the approaches included herein are able to increase the speed by which data replications are performed, improve performance, decrease the amount of system resources are consumed, increase scalability of the system as a whole, etc. These improvements are achieved by implementing a balanced distribution of asynchronous data replication operations which are queued. For example, a number of data replication operations may be queued by a master gateway node among the available worker gateway nodes of a primary site (e.g., local cluster) according to any of the approaches described herein. The distribution of data replication operations among multiple worker gateway nodes uses multiple network routing paths extending between the primary site and remote secondary site. As a result, the approaches included herein are not susceptible to network path and/or gateway node overloading as seen in conventional products. Thus, the improvements achieved herein are in sharp contrast to the various shortcomings experienced in such conventional products. Further still, various approaches included herein are desirably able to achieve parallelization of multiple asynchronous data replication operations of a fileset while also honoring the order of execution, particularly for dependent operations.

The embodiments included herein describe the balanced distribution of asynchronous operations among set of worker gateways nodes of a local cluster. For instance, application nodes send asynchronous operations to a master gateway node of the fileset, where a master gateway node is defined for individual filesets. The master gateway node applies various optimization techniques on the asynchronous operations, e.g., such as coalescing small contiguous write operations into single write operation and removing negatable operation like file create followed by remove operations, etc. The master gateway node then divides the operations into various independent sub-groups of operations where these sub-group operations are executed by different worker gateway nodes in parallel. The sub-groups are preferably created such that no two operations which are dependent on each other are assigned to two separate sub-groups. Accordingly, each of the dependent operations fall into a single sub-group such that those operations are executed on remote cluster in the same order as they were executed on the local cluster.

The sub-groups are built for a unit of time so that the operations from these sub-groups are completed in substantially the same amount of time by corresponding worker gateway nodes. The network bandwidth and workload of the various individual worker gateway nodes are compared against the data size (e.g., the size of all operations in the sub-group) of individual sub-groups while building the sub-groups, preferably such that each of the worker gateways are able to complete the data replication of their respective sub-group at substantially the same time. Once the sub-groups are built for worker gateway nodes they are sent to corresponding worker gateway nodes to be executed. While the sub-groups of operations are being executed by worker gateway nodes, the master gateway node works on the queue and builds the next set of sub-groups. Once each of the worker gateway nodes complete operations from their respective sub-groups, the next set of sub-groups are sent to the corresponding worker gateway nodes. Furthermore, the operations of the sub-groups which are completed are removed from the queue by master gateway node.

Again, the approaches included herein are able to improve the throughput of the data replications by distributing the data replication across different worker gateway nodes which would replicate the data through different network paths. The operations in these sub-groups are also executed independently and in parallel, as multiple worker gateway data replications nodes are used to actually replicate the data. The parallel data replication improves the performance in data replication and also reduces the resources usage on a single gateway node which could otherwise cause resource starvation resulting node failure. The time taken to replicate the data is also reduced, as are the chances of causing the fileset to enter into recovery due to network issue between local cluster and remote cluster in view of the fact that multiple worker gateways are used. Reliability is also increased as any network path between the local and remote clusters failure does not cause problems. This also reduces the wait time (e.g., latency) of operations in the queue at the master gateway node, thereby reducing the resources consumed by the master gateway node. The fileset or filesystem also recovers faster since multiple worker gateway nodes are used in data replication.

Additionally, as described above, the moving average bandwidth of worker gateway nodes are used to build the sub-groups of asynchronous data replications operations. As a result, the worker gateway nodes are assigned an amount of data to be replicated which is proportional to their respective performance and/or capacity. Thus, no single worker gateway node is bottlenecked and the modified data of a fileset is replicated more efficiently since multiple worker gateways are replicating proportional to their capacity. The worker gateway nodes are also loaded fairly balanced, and any changes in network bandwidth is automatically accounted for in balancing the data replication operations among worker gateway nodes in preferred approaches.

The worker gateway nodes are also preferably not dedicated to any single fileset or filesystem. Rather, the worker gateway nodes replicate data of asynchronous operations of any fileset or filesystem, e.g., depending on the desired approach. This increases the overall system throughput since all filesets use all worker gateway nodes. The network bandwidth between local and remote cluster is also used more efficiently as a result, and abrupt spikes in data generation from one fileset or filesystem is distributed among multiple gateway nodes which utilizes resources of the various worker gateway nodes efficiently to achieve replication.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving data replication operations from one or more compute nodes at a primary location; storing the received data replication operations in a queue;
receiving performance information from worker gateway nodes;
dividing the queued data replication operations into a number of independent sub-groups, wherein the number of independent sub-groups is equal to or less than a number of the worker gateway nodes;
adding each of the independent sub-groups to a respective one of the worker gateway nodes; and sending one or more instructions to each of the worker gateway nodes to send the data replication operations included in the respective independent sub-group to a remote storage location, wherein the performance information includes an average bandwidth of the respective worker gateway node, wherein a number of the queued data replication operations divided into each of the independent sub-groups respectively, is based on the average bandwidth of the corresponding worker gateway node.

2. The computer-implemented method of claim 1, wherein dividing multiple ones of the queued data replication operations into a number of independent sub-groups includes:

for each of the queued data replication operations, determining an inode of the queued data replication operation as well as a parent inode of the queued data replication operation;

using the inode and parent inode to determine whether the queued data replication operation depends from a data replication operation already included in one of the independent sub-groups; and in response to determining that the queued data replication operation depends from a data replication operation already included in one of the independent sub-groups, adding the queued data replication operation to the independent sub-group which includes the data replication operation from which the queued data replication operation depends.

3. The computer-implemented method of claim 2, wherein no two or more queued data replication operations which depend on each other are added to different ones of the independent sub-groups.

4. The computer-implemented method of claim 2, comprising:

in response to determining that the queued data replication operation does not depend from a data replication operation already included in one of the independent sub-groups, using a ratio of current size and average bandwidth for each of the worker gateway nodes to select one of the independent sub-groups to add the queued data replication operation to.

5. The computer-implemented method of claim 1, wherein at least some of the data replication operations are received from the one or more compute nodes at the primary location in an asynchronous fashion, wherein the worker gateway nodes send the data replication operations to the remote storage location in parallel to each other.

6. The computer-implemented method of claim 1, wherein none of the worker gateway nodes are dedicated to a specific fileset and/or filesystem.

7. The computer-implemented method of claim 1, wherein the operations are performed by a master gateway node included at a primary storage site, wherein the primary storage site communicates with the remote storage location using a network.

8. A computer program product comprising a computer readable storage medium having program instructions embodied therewith, wherein the computer readable storage medium is not a transitory signal per se, the program instructions readable and/or executable by a processor to cause the processor to perform a method comprising:

receiving, by the processor, data replication operations from one or more compute nodes at a primary location;

storing, by the processor, the received data replication operations in a queue;

receiving, by the processor, performance information from worker gateway nodes;

dividing, by the processor, the queued data replication operations into a number of independent sub-groups, wherein the number of independent sub-groups is equal to or less than a number of the worker gateway nodes;

adding, by the processor, each of the independent sub-groups to a respective one of the worker gateway nodes; and sending, by the processor, one or more instructions to each of the worker gateway nodes to send the data replication operations included in the respective independent sub-group to a remote storage location, wherein the performance information includes an average bandwidth of the respective worker gateway node, wherein a number of the queued data replication operations divided into each of the independent sub-groups respectively, is based on the average bandwidth of the corresponding worker gateway node.

9. The computer program product of claim 8, wherein dividing multiple ones of the queued data replication operations into a number of independent sub-groups includes:

for each of the queued data replication operations, determining an inode of the queued data replication operation as well as a parent inode of the queued data replication operation;

using the inode and parent inode to determine whether the queued data replication operation depends from a data replication operation already included in one of the independent sub-groups; and in response to determining that the queued data replication operation depends from a data replication operation already included in one of the independent sub-groups, adding the queued data replication operation to the independent sub-group which includes the data replication operation from which the queued data replication operation depends.

10. The computer program product of claim 9, wherein no two or more queued data replication operations which depend on each other are added to different ones of the independent sub-groups.

11. The computer program product of claim 9, the program instructions readable and/or executable by the processor to cause the processor to perform the method comprising:

in response to determining that the queued data replication operation does not depend from a data replication operation already included in one of the independent sub-groups, using, by the processor, a ratio of current size and average bandwidth for each of the worker gateway nodes to select one of the independent sub-groups to add the queued data replication operation to.

12. The computer program product of claim 8, wherein at least some of the data replication operations are received from the one or more compute nodes at the primary location in an asynchronous fashion, wherein the worker gateway nodes send the data replication operations to the remote storage location in parallel to each other.

13. The computer program product of claim 8, wherein none of the worker gateway nodes are dedicated to a specific fileset and/or filesystem.

14. The computer program product of claim 8, wherein the operations are performed by a master gateway node included at a primary storage site, wherein the primary storage site communicates with the remote storage location using a network.

15. A system, comprising:

a processor; and logic integrated with the processor, executable by the processor, or integrated with and executable by the processor, the logic being configured to:

receive, by the processor, data replication operations from one or more compute nodes at a primary location;

store, by the processor, the received data replication operations in a queue;

divide, by the processor, the queued data replication operations into a number of independent sub-groups, wherein the number of independent sub-groups is equal to or less than a number of worker gateway nodes, wherein dividing multiple ones of the queued data replication operations into a number of independent sub-groups includes:

for each of the queued data replication operations, determining an inode of the queued data replication operation as well as a parent inode of the queued data replication operation, using the inode and parent inode to determine whether the queued data replication operation depends from a data replication operation already included in one of the independent sub-groups, and in response to determining that the queued data replication operation depends from a data replication operation already included in one of the independent sub-groups, adding the queued data replication operation to the independent sub-group which includes the data replication operation from which the queued data replication operation depends;

add, by the processor, each of the independent sub-groups to a respective one of the worker gateway nodes; and send, by the processor, one or more instructions to each of the worker gateway nodes to send the data replication operations included in the respective independent sub-group to a remote storage location, wherein at least some of the data replication operations are received from the one or more compute nodes at the primary location in an asynchronous fashion, wherein the worker gateway nodes send the data replication operations to the remote storage location in parallel to each other.

16. The system of claim 15, the logic being configured to:

receive, by the processor, performance information from each of the worker gateway nodes, wherein the performance information includes an average bandwidth of the respective worker gateway node, wherein a number of the queued data replication operations divided into each of the independent sub-groups respectively, is based on the average bandwidth of the corresponding worker gateway node.

17. The system of claim 15, the logic being configured to:

in response to determining that the queued data replication operation does not depend from a data replication operation already included in one of the independent sub-groups, use, by the processor, a ratio of current size and average bandwidth for each of the worker gateway nodes to select one of the independent sub-groups to add the queued data replication operation to, wherein no two or more queued data replication operations which depend on each other are added to different ones of the independent sub-groups.

* * * * *